March 24, 1925.
C. W. NIEMAN
INDICATOR
Filed March 7, 1924
1,531,125
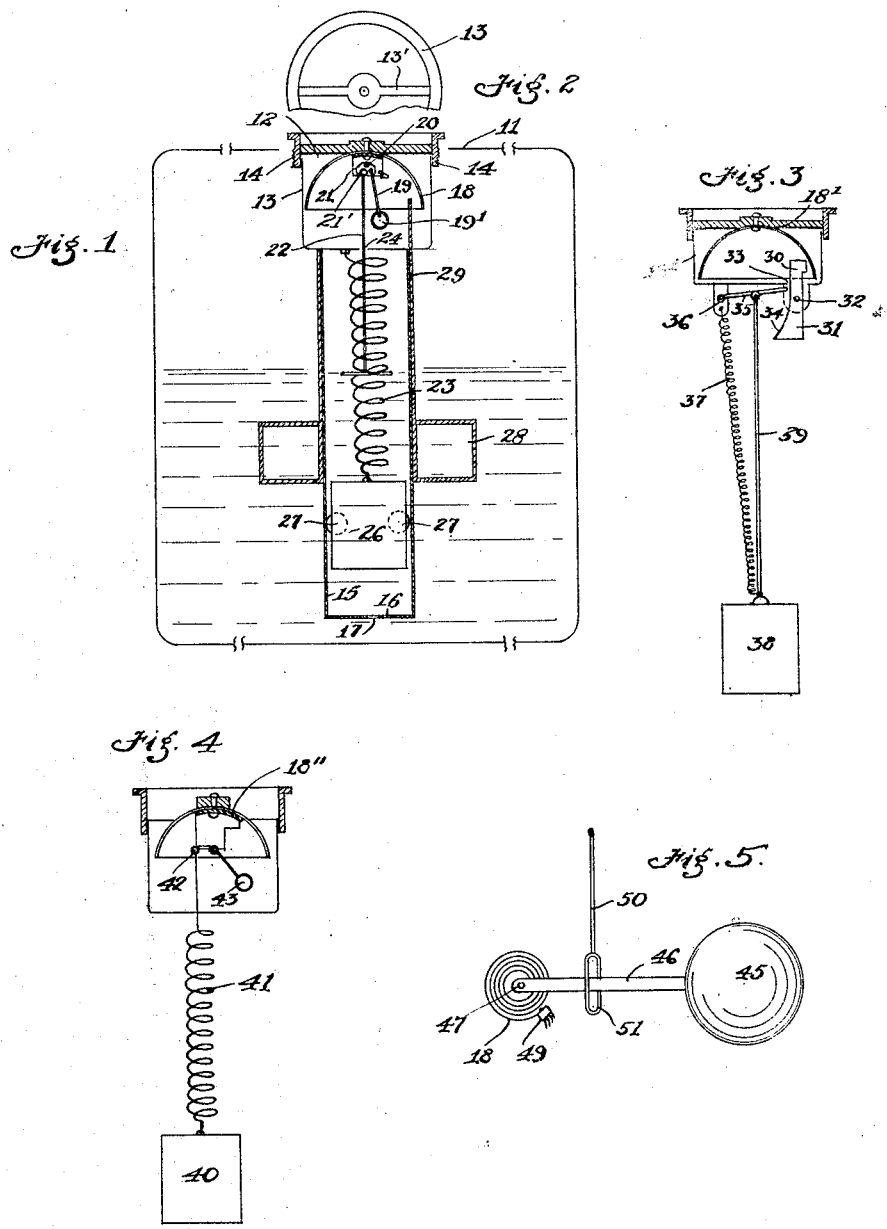
Inventor
Chauncy W. Nieman
By A. B. Reavis
Attorney Patented Mar. 24, 1925.

1,531,125

UNITED STATES PATENT OFFICE.

CHAUNCY W. NIEMAN, OF ST. GEORGE, NEW YORK.

INDICATOR.

Application filed March 7, 1924. Serial No. 697,514.

*To all whom it may concern:*

Be it known that I, CHAUNCY W. NIE-MAN, a citizen of the United States, and residing at St. George, Richmond County, New York, have invented certain new and useful Improvements in Indicators, of which the following is a specification.

My invention relates to indicating devices for indicating the condition of depletion of fluid from a suitable receptacle, for example, the gasoline tank of an automobile, and it has for an object to provide apparatus of this character which shall be economical to construct and reliable in operation.

More particularly my invention has for an object to provide an indicator which shall indicate the exhaustion of fluid from a receptacle to a predetermined extent, such indicator having for the motivating element thereof a mechanism which is responsive to vertical vibrations of a body upon which the receptacle is mounted.

A further object of my invention is to provide an indicator for the gasoline tank of a motor vehicle which shall include a vertically vibratory system in the tank, the system incorporating a spring and a weight so that vertical vibrations of the vehicle may build up vibrations of the system so that the latter has a sufficient amplitude of vibration to actuate a suitable indicator.

I am aware that the prior art shows that the principle of vibration indicators for motor vehicle tanks is old; however, all of such schemes of which I have knowledge depend upon vibration or tilting in horizontal planes or depend upon pendulum action. Such devices have proved to be unreliable and not capable of giving strong and certain signals. Appreciating that an automobile has considerable vertical vibration in operation, I have provided a system which utilizes such vibrations cumulatively until the amplitude of vibrations is sufficient to actuate a suitable alarm or indicator.

Apparatus made in accordance with my invention is illustrated on the accompanying drawings, forming a part of this application, in which:

Fig. 1 is a sectional view of a motor vehicle gasoline tank showing my novel type of indicator applied thereto;

Fig. 2 is a fragmentary plan view of the indicator; and

Figs. 3, 4, and 5 are detail views of modified forms of my indicating apparatus.

Referring now to the drawings for a better understanding of my invention, in Fig. 1, I show a gasoline tank, or any other suitable receptacle, 10 having a filling opening 11 adapted to receive the indicating device, at 12.

The indicating device, at 12, comprises an upper cup member 13, preferably provided with exterior threads 14 to fit the threads of the filling opening. In Fig. 1, I show a tubular member 15 depending from the bottom of the cup member 13 and having a bottom 16 adjacent to the bottom of the tank or receptacle 10, the bottom 16 being provided with a small opening 17, all for the purposes to be hereinafter set forth.

The indicator or alarm element in Fig. 1 is shown as a bell 18 secured in any suitable manner within the cup member 13. For example, I show a cross bar 13' extending across the cup member and to which the bell is secured. A clapper arm 19 is pivoted at 20 within the bell and it is provided with a crank portion 21 pivotally connected, at 21', to the link 22, which engages the spring 23 at an intermediate point of the latter, the link passing through a small opening 24 in the bottom of the cup member 13. The clapper arm 19 preferably carries at its lower end a clapper ring 19'.

The crank portion 21 preferably extends downwardly so that, in the position of rest, the pivotal connection 21' is to one side of the lower end of the link 22. When the pivotal connection 21' is on the dead center line, the lower end of the clapper arm 19 is spaced from the bell 18 a distance greater than the thickness of the clapper ring 19', so that, when the clapper arm 19 comes to a stop at dead center position, the kinetic energy of the clapper ring 19' is effective to cause the latter to swing quickly to give the bell a quick tap or blow in order that the bell may be sounded to the best advantage.

The spring 23 is connected to the underside of the cup member 13 in any suitable manner and it is located within the tubular member 15. A weight 26 is suspended from the lower end of the spring 23 and it is guided by the tubular member 15, antifriction rollers 27 being carried by the weight in order to reduce friction.

The tubular member 15 extends substantially in a vertical direction. Fluid enters through the small opening 17 so that the level in the tubular member is the same as that in the tank. Ordinarily, if the weight 26 is submerged, its vibrations, due to vertical movements of the vehicle on which it is mounted, are effectively dampened; however, just as soon as the level falls below the weight, the system vibrates strongly and cumulatively, resulting in sounding of the bell 18 which indicates that the supply of gasoline is getting low.

The small opening 17 in the bottom 16 of the tubular member effectively prevents inertia effects of the body of gasoline in the tank from acting on the vibratory system with sufficient strength to actuate the indicator.

If desired, apparatus may be incorporated to prevent contact of the clapper ring 19' with the bell 18 until the liquid level in the tank has been reduced to a predetermined extent. To this end, in Fig. 1, I show a float 28 connected to an upstanding member 29, the latter being located between the clapper and the bell until it is moved out of the way owing to the fall of the level of liquid in the tank. It is to be understood that my improved indicating apparatus operates satisfactorily without the float 28 and the interfering member 29, the restricted flow through the opening 17 throttling inertia effects so that the amplitude of vibration of the vibratory system is insufficient to actuate the alarm. Also, as long as vibratory movement of the weight is interfered with by fluid in the tubular member, vibrations cannot build up cumulatively to a sufficient extent to actuate the alarm. The float 28 and the interfering member 29, therefore, constitute an adjunctive arrangement with may sometimes be found convenient.

In Fig. 3, I show a modified form of my indicating apparatus, which is essentially the same as that shown in Fig. 1 except for certain changes in the spring and weight arrangement as well as the bell clapper and its actuating device. Here the clapper 30 has a weighted end 31 and it is pivoted at 32 to swing through a slot 33 in the bottom of the cup member 13'. The back side of the clapper is provided with a curved or cam surface 34 for engagement by a swinging arm 35, pivoted to a lug 36 depending from the bottom of the cup member 13'.

A spring 37 is connected to the lug 36 at one end and to a weight 38 at its lower end, the weight being also connected by a link 39 to an intermediate point of the arm 38. In operation, when the level of fluid falls below the weight 38, vibrations build up cumulatively and the clapper 30 is actuated to ring the bell 18'.

In Fig. 4, I show a weight 40 suspended by a spring 41, which is connected to the crank arm 42 of the clapper 43 of the bell 18''. In this modification, the clapper is made heavy enough to keep it from engaging the bell until vibrations of sufficient amplitude are attained. The weight and the spring constitute a vibratory system which acts cumulatively to ring the bell as soon as the level of fluid is reduced sufficiently.

In Fig. 5, I show a form of my invention in which a weight 45 is connected to an arm 46, which is pivoted at 47, the arm and weight being sustained for vibration in substantially a vertical path by a spiral spring 48 connected at one end to the arm 46 and at the other end to a stationary support 49. A clapper actuating link 50 engages the arm at an intermediate point and there is a sufficient amount of lost motion between the two, as by a slot 51, to prevent small vibrations from operating the indicator.

While, in the foregoing description, I have referred to a motor vehicle gasoline tank, it is to be understood that my improved indicator may be used in connection with any receptacle mounted on a body having vertical vibratory movement; and by "vertical vibratory movement" is meant movement which is wholly vertical or movement which has a vertical component. Also, while I prefer to use a tubular member 15 to guide the weight member and to guard the vibratory system against excessive inertia effects of the fluid in the tank, as indicated in Fig. 1, yet it is to be understood that the vibratory system might be mounted freely in a receptacle. Furthermore, while I have shown the indicator at the top of the receptacle, it will be obvious that it might be mounted at any suitable place, it being necessary merely to provide suitable linkage connections between the vibratory system and the indicator.

While I have shown my invention in a plurality of forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination, with a receptacle adapted to be mounted on a body subject to vertical vibratory movements, of an indicator, including a moveable element, vibratory mechanism including a weight moveable in a substantially vertical path and an elastic device for supporting the weight and an operating connection between said mechanism and the moveable element of the indicator.

2. The combination, with a receptacle adapted to be mounted on a vibratory body, of an indicator including a moveable element, vibratory mechanism including a weight moveable in substantially a vertical path in the receptacle and means for supporting the weight, and a link for communicating motion of the weight to the moveable element of the indicator.

3. The combination, with a receptacle for fluid adapted to be mounted on a body subject to vertical vibrations, of an indicator, including a moveable element, vertically vibratory means adapted to be submerged in fluid when the receptacle is filled to a predetermined extent, and means for transmitting motion from the vibratory means to the moveable element of the indicator.

4. The combination, with a receptacle for fluid adapted to be mounted on a body subject to vertical vibrations, of a bell, a clapper for the bell, a weight in the receptacle, a spring for supporting the weight, and a link for connecting the spring to the clapper of the bell.

5. The combination, with a receptacle for fluid adapted to be mounted on a body subject to vertical vibratory movements, of a bell, a clapper for the bell, vertically vibratory mechanism in a receptacle, and a link connected to said mechanism and cooperating with the clapper to ring the bell when vibratory movements are not impeded by fluid in the receptacle.

6. The combination, with a receptacle for fluid adapted to be mounted on a body subject to vertical vibrations, of a bell, a clapper pivotally mounted with respect to the bell and having an actuating crank portion, a weight in the receptacle, a spring for supporting the weight, and a link for connecting the spring to the crank portion.

7. The combination, with a receptacle adapted to be mounted on a body subject to vertical vibratory movements, of an indicator, including a moveable element, a weight moveable in a vertical path in the receptacle, a spring for supporting the weight, and a link for transmitting vibratory movements of the spring and weight of predetermined magnitude to the moveable element of the indicator.

8. The combination, with a fuel tank for a motor vehicle, of a bell at the top of the tank, said bell including a moveable element, means subject to the level of liquid in the tank for operating the moveable element of the bell including a weight moveable in substantially a vertical path and a spring for supporting the weight, and connecting means between the first means and the moveable element of the bell.

9. The combination, with a motor vehicle fuel tank, of an indicator, including a moveable element, vertically vibratory mechanism associated with the tank and subject to the level of liquid therein, and means for transmitting vibratory movements of said mechanism to the moveable element of the indicator when vibratory movements of the mechanism are sufficiently unimpeded by liquid.

10. The combination, with a motor vehicle fuel tank, of an indicator including a moveable element, vertically vibratory mechanism for the tank adapted to be submerged when the tank is filled, whereby vibrations of said mechanism are dampened, and adapted to vibrate with greater amplitude when the tank is emptied to a predetermined extent, means for transmitting vibratory movements of said mechanism to the moveable element of the indicator, and means for preventing actuation of the moveable element of the indicator until the quantity of fuel in the tank is reduced to a predetermined extent.

11. The combination, with a motor vehicle fuel tank having a filling opening, of a cup member provided with an opening at its top and adapted to fit the filling opening, an alarm in the cup member, means for actuating the alarm extending through the bottom of the cup member and including a weight in the tank moveable in substantially a vertical path and elastic means for supporting the weight, and an operating connection between said means and the alarm.

12. The combination, with a motor vehicle fuel tank having a filling opening, of a cup provided with an opening at its top and adapted to fit the filling opening, an alarm in the cup, and means for actuating the alarm including a weight moveable in substantially a vertical path in the tank, a spring for supporting the weight, and means connected to the spring for actuating the alarm, said means extending through the bottom of the cup.

13. The combination, with a motor vehicle fuel tank, having a filling opening, a casing construction fitting the filling opening, an indicator in the casing construction, said indicator including a moveable element, vibratory mechanism carried by the casing construction, said mechanism including a weight and a spring for supporting the weight, and means for transmitting vibratory movements of said mechanism to the moveable element of the indicator.

14. The combination, with a motor vehicle fuel tank having a filling opening, a cup fitting the opening, an indicator in the cup, said indicator including a moveable element, a tubular member depending from the cup, said tubular member having a bottom provided with a small opening therein, vibratory mechanism in the tubular member including a weight and a spring for supporting the weight, and means for transmitting vibratory movements of said mechanism to the moveable element of the indicator.

15. The combination, with a motor vehicle fuel tank having a filling opening, a cup fitting the opening, an indicator in the cup, said indicator including a moveable element, a tubular member depending from the cup, said tubular member having a bottom provided with a small opening, vibratory mechanism in the tubular member including a weight and a spring for supporting the weight, a link for transmitting vibratory movements of said mechanism to the moveable element of the indicator, and means for preventing operation of the moveable element of the indicator to an operative degree until the quantity of fuel in the tank is reduced to a predetermined extent.

16. The combination, with a motor vehicle fuel tank having a threaded filling opening, of a cup member having exterior threads to fit the threads of the filling opening and having an opening in the bottom thereof, indicator elements in the cup member including a gong and a clapper, one of said elements being movable, vertically vibratory mechanism in the tank including a weight and a spring for supporting the weight, and a connection between said mechanism and the movable one of said indicator elements and extending through the opening in the bottom of the cup member.

17. The combination, with a motor vehicle fuel tank having a threaded filling opening, of a cup member having external threads to fit the filling opening threads and having an opening in the bottom thereof, a tubular member depending from the cup member, indicator elements in the cup member including a gong and a clapper, one of said elements being movable, vertically vibratory mechanism in the tubular member including a weight and a spring for supporting the weight, and an operating connection between said mechanism and the movable one of said indicator elements.

18. An indicating device comprising a cup member, a tubular member secured to the bottom of the cup member and adapted to be disposed normally in substantially a vertical position for operation, a weight in the tubular member, a spring for supporting the weight within the tubular member, an indicator in the cup member, said indicator including a moveable element, and a link for transmitting vibratory movements of the spring and weight to the moveable element of the indicator.

19. The combination, with a motor vehicle fuel tank, of an indicator, including a moveable element, a substantially vertical tubular member suspended from the top of the tank, a weight moveable in the tubular member, a spring for supporting the weight, and tension means connected to the moveable element of the indicator and supporting the spring.

20. The combination, with a motor vehicle fuel tank having a filling opening, a cup member fitting the opening, a bell in the cup member, a clapper for the bell, a tubular member depending from the cup member, said tubular member having a bottom provided with a small opening, a weight moveable in the tubular member, a spring for supporting the weight, and a link for connecting the spring to the clapper, said link extending through an opening in the bottom of the cup member.

21. The combination, with an indicator, including a moveable element, of vertically vibratory mechanism for actuating the moveable element of the indicator and dash-pot means for checking vibrations of the vibratory mechanism.

22. The combination, with a receptacle adapted to contain fluid, of an indicator for indicating the condition of depletion of fluid in the receptacle, said receptacle including a moveable element, a vibratory system for actuating the moveable element of the indicator, and dash-pot means in open communication with the interior of the receptacle to dampen vibrations of the system until the level in the receptacle is sufficiently reduced.

In testimony whereof I hereunto affix my signature at New York city, N. Y. Co., and State of New York, this 28th day of Feby., 1924.

CHAUNCY W. NIEMAN.